United States Patent

[11] 3,601,636

[72] Inventor Lynn W. Marsh, Jr.
Melrose, Mass.
[21] Appl. No. 835,606
[22] Filed June 23, 1969
[45] Patented Aug. 24, 1971
[73] Assignee Mohawk Data Sciences Corporation
Herkimer, N.Y.

[54] SINGLE-SHOT DEVICE
6 Claims, 5 Drawing Figs.

[52] U.S. Cl. .......... 307/273, 307/208, 307/215, 328/92, 328/207
[51] Int. Cl. .......... H03k 3/284, H03k 19/36
[50] Field of Search .......... 307/208, 215, 218, 273; 328/92, 207

[56] References Cited
UNITED STATES PATENTS

| | | | |
|---|---|---|---|
| 3,049,628 | 8/1962 | Kaufman | 307/215 |
| 3,395,362 | 7/1968 | Sutherland | 307/215 X |
| 3,396,282 | 8/1968 | Sheng et al. | 307/208 |
| 3,517,326 | 6/1970 | Roesch | 307/215 X |

*Primary Examiner*—Stanley D. Miller, Jr.
*Attorneys*—Francis J. Thomas, Richard H. Smith, Thomas C. Siekman and Sughrue, Rothwell, Mion, Zinn and Macpeak

ABSTRACT: A single-shot device having two NAND gates which are interconnected to provide an output signal in response to an input signal. The output signal remains for a predetermined duration until the output signal of one NAND gate is applied through a delay to the other NAND gate. The delay comprises a transient network which performs an integrating function and contains a series connected resistor and a parallel connected capacitor.

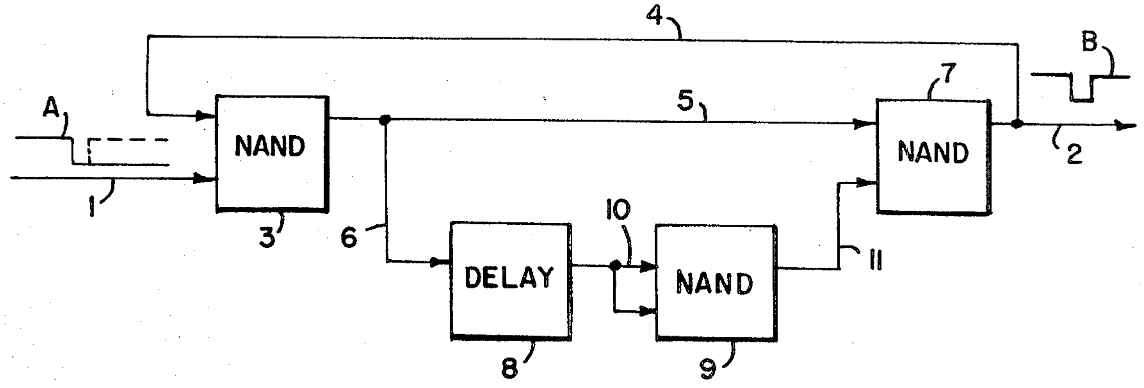
FIG. 1
| IN | IN | OUT |
|---|---|---|
| H | H | L |
| H | L | H |
| L | H | H |
| L | L | H |
FIG. 2
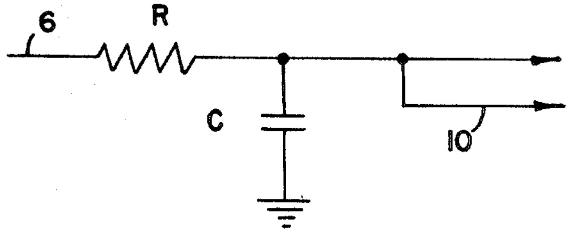
FIG. 3
INVENTOR
LYNN W. MARSH, JR.
BY, Thomas C. Sickman
ATTORNEY

SINGLE-SHOT DEVICE

BACKGROUND OF THE INVENTION

This invention relates to electrical circuits useful in digital computers and, more particularly, to circuits containing delay elements.

Numerous existing circuits containing delay elements produce output signals having predetermined relationships to applied signals. Examples of these are single-shots, multivibrators and various timing and control circuits.

In the prior art, when the output signal of a logic circuit is to be fed through a delay to another logic circuit, the delay circuit generally comprises a series connected capacitor and a parallel connected resistor to form a differentiating circuit between the logic circuits. Although providing the desired delay, when waveshapes having steep rises and declines are applied to differentiator circuits, the output signals contain relatively large voltage excursions in both directions. These large voltage excursions have little or no adverse affect on most circuits and, in some cases are necessary for proper operation. However, modern integrated circuits are often damaged by these large voltage excursions, particularly those which are of the opposite polarity from that which the circuits are designed to handle. These disadvantages are overcome in the present invention by the use of integrator circuits which are capable of delaying applied signals without producing the undesirable large voltage excursions.

Modern integrated circuits pose additional design limitations in that a single substrate often contains several identical basic logic circuits. In the present invention, a single-shot function is performed solely by the use of one type of basic logic circuit, the NAND gate.

SUMMARY OF THE INVENTION

Accordingly, it is an object of this invention to provide a circuit apparatus containing a logic circuit whose output signal is applied through a delay to a second logic circuit and in which the logic circuits are operated within their specifications.

It is another object to provide a single-shot device which is inexpensive and in which the elements thereof are operated within their specifications.

It is a further object to provide a single-shot device in which all the logic circuits therein are identical in structure and function.

It is a further object to provide a single-shot device which is responsive to an edge of an input signal applied thereto.

These and other objects are achieved by utilizing a transient network which performs an integrating function as a delay connected between two logic circuits. The transient network is preferably a resistor connected between the two logic circuits and a capacitor connected in parallel with the output logic circuit.

A single-shot device is provided which contains a delay comprising such an integrating transient network and a plurality of logic circuits identical in structure and function. The input signal fed to the single-shot is applied to one of the inputs of a first logic circuit. The first logic circuit is interconnected with a second logic circuit such that the output of the first one is connected to an input of the second and the output of the second is connected to an input of the first. The output of the first logic circuit is also applied through the transient network to the other input of the second. A third identical logic circuit is employed to modify the coupling of the transient network to the second logic circuit to enable the use of only one type of basic logic circuit in the single-shot.

Since such a single-shot device utilizes identical logic circuits it is relatively simple and inexpensive, particularly when integrated circuits are employed. The use of an integrating network, rather than a differentiating network, also has the advantage of requiring a smaller capacitor.

BRIEF DESCRIPTION OF THE DRAWING

FIG. 1 is a block diagram of preferred embodiment of a single-shot device incorporating the invention.

FIG. 2 is a diagram illustrating the "truth table" of a NAND gate of the type employed in the diagram of FIG. 1.

FIG. 3 is a circuit diagram of a preferred embodiment of the delay network that is shown in FIG. 1.

DESCRIPTION OF THE PREFERRED EMBODIMENT

FIG. 1 shows a circuit for providing a low output signal of a predetermined duration in response to a transition in its input signal from a high to a low voltage. The circuit includes three NAND gates, each having two inputs and one output. Binary signals are applied to and derived from the inputs and outputs. Each NAND gate, as illustrated by the "truth table" in FIG. 2, is a circuit element which produces a low output signal only when all of its inputs are high. Should either of the NAND gates inputs be low, a high output signal is produced. Such NAND gates are well known. For example, Texas Instruments, Inc. markets a binary input NAND gated termed SN 7400.

The NAND gates in FIG. 1 are all identical in structure and function. All the high inputs and outputs are represented by substantially equal voltages, just as are all the low inputs and outputs represented by substantially equal (but lower) voltages. High signals, whether inputs or outputs, are represented by about 2.4 volts while low signals, whether inputs or outputs, are represented by about 0.4 volts.

Figure 4:
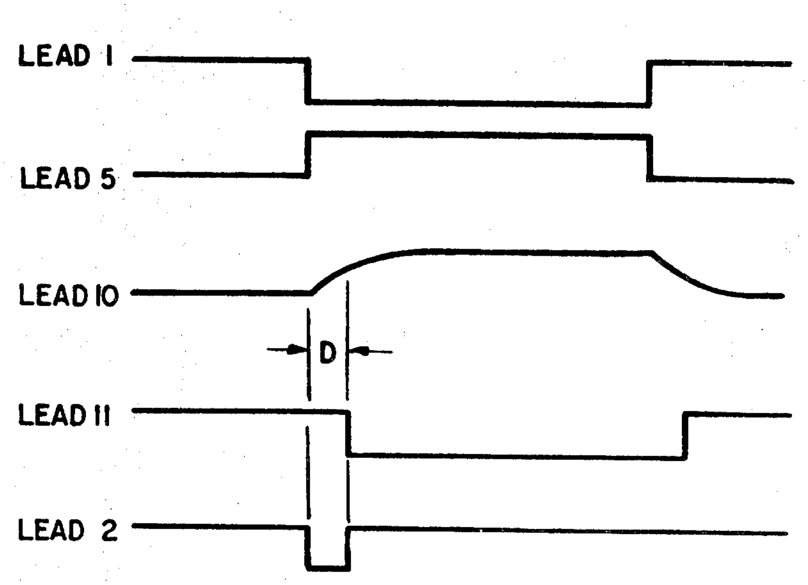
FIGS. 4 and 5 are timing diagrams illustrating the operation of the circuit shown in FIG. 1.

FIGS. 1 and 4 illustrate the operation of the circuit. In its stable inactivated state, a high signal is normally applied on the circuit's input lead 1 and the circuit provides a high signal on its output lead 2. The high input signal is applied to an input of a first NAND gate 3 while the high output signal is applied via lead 4 to the other input of the first NAND gate 3. In accordance with the "truth table" in FIG. 2, the first NAND gate 3 provides a low output signal which is fed over leads 5 and 6.

Lead 5 connects the output of the first NAND gate 3 to an input of a second NAND gate 7. Lead 6 transmits the first NAND gate's output to a delay 8. After the time lag determined by the delay 8, the signal is applied to both of the inputs of a third NAND gate 9 via leads 10. The third NAND gate thus operates as an inverter and produces a high output signal.

This high output signal is fed to an input of the second NAND gate 7 via lead 11. The second NAND gate 7 thus has a high signal applied to one of its inputs on lead 11 while a low signal is applied to its other input on lead 5. The second NAND gate will thus provide a high output signal which is fed over the circuit's output lead 2 and over lead 4.

When the circuit is activated by the input signal A on lead 1 going from a high to a low voltage, a low pulse B of predetermined duration occurs on the output lead 2. Thus, the circuit provides a single-shot output signal when activated. As indicated in FIG. 1, the single-shot output occurs whether the low voltage on lead 1 is only a short pulse or a signal of indefinite duration.

The operation of the circuit when activated is as follows. As noted above, in the circuit's unactivated condition a high signal is applied to that input of the first NAND gate 3 connected to lead 4. Thus, when the input signal on lead 1 becomes low, the first NAND gate 3 produces a high output signal. This high output is transmitted to an input of the second NAND gate 7 whose other input (as previously noted) normally receives a high signal. Thus, at this time, the second NAND gate 7 receives two high inputs and produces a low output which is fed over the circuit's output lead 2 and back to an input of the first NAND gate 3 over lead 4.

The first NAND gate 3, since a low signal is now applied via lead 4 to one of its inputs produces a high output. This output is now independent of the signal being applied on the input lead 1 to the first NAND gate 3. The input may return to a high voltage or may remain low; in either case the first NAND gate produces a high output because a low signal is being applied to it via lead 4. The high output signal from the output of the first NAND gate 3 which is applied to an input of the second NAND gate 7, allows the second NAND gate to continue to provide a low signal at its output and over lead 4. The first and second NAND gates are thus latched together and, while they are so latched, a low output signal is produced on the circuit's output lead 2.

However, the output of the second NAND gate 7 is also dependent on the input signal applied to it via lead 11. The high signal derived from the first NAND gate 3 is also fed over lead 6, through the delay 8 and leads 10 to both the inputs of the third NAND gate 9. The high signal on lead 6 produces a shaped, positive-going signal on lead 10. When this signal reaches a predetermined level, the output of NAND 9 drops to a low output. At this time, the second NAND gate 7 receives a low signal on lead 11 as well as a high signal on lead 5. The second NAND gate 7 then responds with a high signal at its output which represents the end of the output pulse on lead 2 as well as breaking the latch feedback between the second and first NAND gates. With a high signal again being applied to the first NAND gate 3 on both input leads, the first NAND gate's output on lead 5 becomes low.

As indicated by the voltage-time diagram of lead 10 in FIG. 4, the delay comprises a transient network which performs an integrating function. When a high signal is fed over lead 6 to the delay, the output voltage on lead 10 rises according to a logarithmic function. When a certain critical voltage is reached, the third NAND gate 9 is activated by the high signals applied to its inputs over leads 10. The time between the application of high signal to the delay 8 and when this critical voltage is reached constitutes the delay time indicated by D in FIG. 4.

When the signal on lead 6 drops to a low voltage, the voltage on lead 10 drops (again according to a logarithmic function) and, upon reaching a critical voltage, changes the state of the third NAND gate 9 so that it provides a high output and the circuit becomes stable in its unactivated condition.

As illustrated in FIG. 3, the preferred delay comprises a resistor R series connected between lead 6 and leads 10 and a capacitor C connected between leads 6 and 10 and ground. Since ground is common to all of the NAND gates, the capacitor is parallel connected. When a high voltage is applied to resistor R, the capacitor C begins charging and when a low voltage is applied, it discharges. This resistor-capacitor transient network provides an integrating function with a waveshape as illustrated in FIG. 4. While the circuit could be redesigned to permit the use of a conventional differentiating delay network, such a network would provide, in addition to the desired positive-going charging waveshape, a negative spike as when a low signal is applied. Many integrated circuits, including the preferable series SN 7400 marketed by Texas Instruments, Inc. require that input signals be zero or positive. Furthermore, the total voltage excusions permitted by this type of circuit is limited and would ordinarily be exceeded by the use of a differentiating circuit.

The duration of the output signal B is dependent on the values of R and C. As specific examples, using Texas Instruments, Inc. SN 7400 NAND gates and an 810 OHM resistor, durations of approximately 200 nanoseconds, 2 microseconds, and 22 microseconds are obtained by using capacitor values of 0.001, 0.01 and 0.1 microfarads respectively. Comparable delays using a differentiating circuit would require larger capacitance values.

Figure 5:
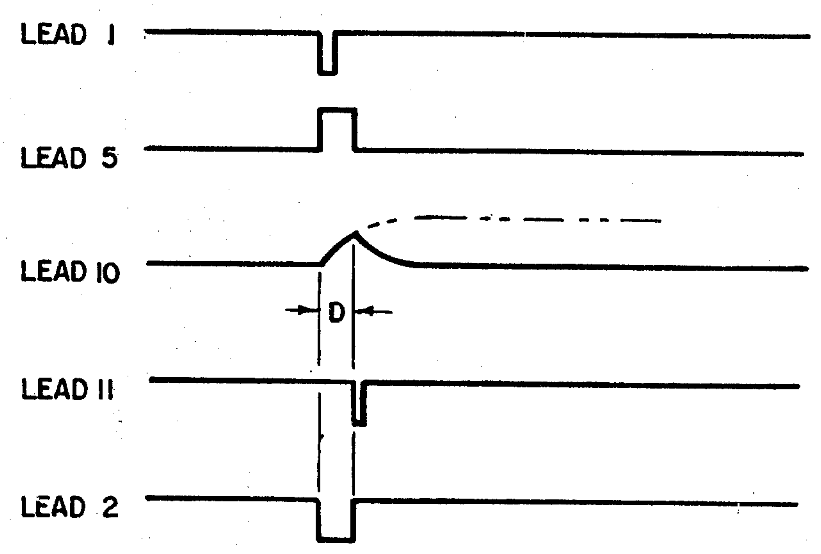

FIG. 5 illustrates the signals occurring in the circuit in response to a short low pulse on lead 1. As explained above, the transition of the signal A from high to low on lead 1 causes the first and second NAND gates (3 and 7) to become latched together with the second NAND gate 7 receiving a high signal over lead 11 and a high signal from the output of the first NAND gate over lead 5. The first NAND gate receives a low signal from the output of the second NAND gate and thus, irrespective of the signal over lead 1, provides a high signal on lead 5.

This latched condition continues until a low signal from the third NAND gate 9 is fed to the second NAND gate 7 via lead 11. This low signal is delayed for the time interval D by the delay 8. Thus, irrespective of the duration of the input signal A on lead 1, the output pulse on lead 2 has a predetermined duration equal to the delay time D.

I claim:

1. An apparatus comprising:
a. a plurality of identical logic circuits, each having two inputs and an output and being responsive to input signals to produce an output signal having a predetermined relationship to the input signals;
b. means for applying an input signal to one of the inputs of a first one of the logic circuits;
c. means for connecting the output of the first one to an input of a second one of the logic circuits;
d. means for connecting the output of the second one to the remaining input of the first one of the logic circuits; and
e. means for connecting the output of the first one through a circuit including an integrating network to the remaining input of the second one of the logic circuits.

2. The apparatus as recited in claim 1 wherein the circuit including an integrating network comprises a third logic circuit having two inputs connected to the integrating network and an output connected to an input of the second logic circuit.

3. The apparatus as recited in claim 2 wherein all the logic circuits are NAND gates.

4. An apparatus comprising:
a. first and second logic circuits, each having two inputs and an output and being responsive to input signals to produce an output signal having a predetermined relationship to the input signals;
b. means for applying an input signal to one of the inputs of the first logic circuit;
c. first means for connecting the output of the first logic circuit to an input of the second logic circuit;
d. second means for connecting the output of the second logic circuit to the remaining input of the first logic circuit; and
e. third means for connecting the output of the first logic circuit to the remaining input of the second logic circuit, the third connecting means including a delay circuit adapted to receive an output signal from the first logic circuit and to apply an input signal to the remaining input of the second logic circuit a predetermined time thereafter.

5. The apparatus as recited in claim 4 wherein the delay circuit comprises an integrating network.

6. The apparatus as recited in claim 5 wherein the third connecting means further comprises a third logic circuit having two inputs connected to the integrating network and an output connected to an input of the second logic circuit.